Nov. 18, 1952     W. J. S. JOHNSON     2,618,496
ADJUSTABLE SUPPORTING LEG
Filed Sept. 15, 1947
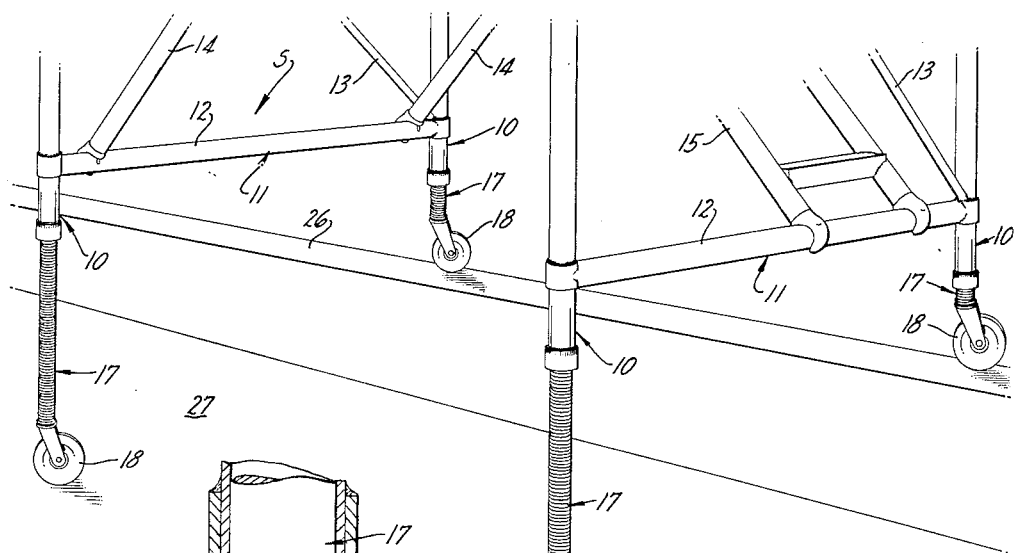
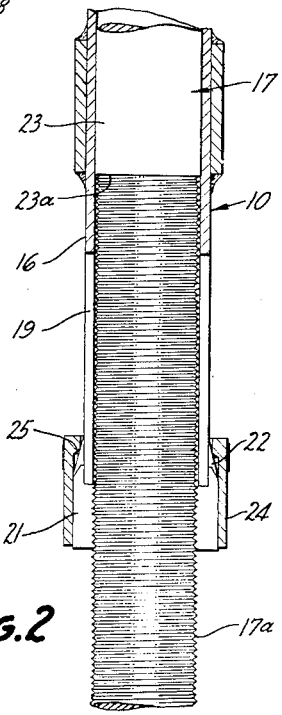
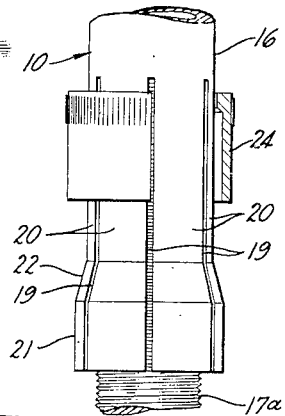
INVENTOR.
WALLACE J. S. JOHNSON
BY
*Mellin + Hanscom*
ATTORNEYS Patented Nov. 18, 1952

2,618,496

UNITED STATES PATENT OFFICE 2,618,496

ADJUSTABLE SUPPORTING LEG

Wallace J. S. Johnson, Berkeley, Calif.

Application September 15, 1947, Serial No. 774,036

1 Claim. (Cl. 287—62)

The present invention relates to a leg construction, and more particularly to an adjustable supporting leg adapted to form part of a scaffold, hospital bed, table, or other device in which the effective length of one or more supporting legs is to be varied.

It is an object of the present invention to provide a supporting leg for a device whose effective length can be adjusted to comparatively coarse and fine degrees.

Another object of the invention is to provide an adjustable supporting leg for a device adapted for both coarse and fine adjustments and also capable of being positively locked in any adjusted position.

A further object of the invention is to provide a telescopic adjustable supporting leg for a device whose members cannot be removed inadvertently from telescopic relation with respect to each other.

In its general aspects, the invention contemplates a telescopic supporting leg having cooperable clutch members which may be readily disengaged from one another to permit movement of the telescopic members with respect to each other in effecting variations in the length of the leg structure. The clutch members may be engaged and held in positive engagement in such manner as to prevent inadvertent change in the effective length of the supporting leg. Moreover, with the clutch engaged, one of the leg members may be rotated with respect to the other leg member to effect a fine adjustment. The parts have cooperable elements thereon, which will prevent inadvertent complete withdrawal of one leg member from the other, thus insuring maintenance of their mutual telescopic relation.

One form which the invention may assume is exemplified in the following description and illustrated by way of example in the accompanying drawings, in which:

Fig. 1 is a perspective view of a device embodying the invention.

Fig. 2 is a longitudinal section through one of the supporting legs of the device, with its parts in locked position.

Fig. 3 is a side elevation of the supporting leg, with its parts in unlocked relation.

The invention has been particularly disclosed in the drawings as forming part of a scaffold unit S. It is to be understood, however, that it may form part of other devices in which an adjustment of the effective length of the legs is desired.

As disclosed in Fig. 1, a scaffold is provided having vertical legs 10 formng part of the end structures 11 and secured, as by welding, to a lower cross member 12 disposed above the lower ends of the legs. Each end structure of the scaffold may also include a diagonal brace 13, and the end structures 11 themselves may be attached together by diagonal braces 14 running from a lower cross member 12 on one structure to an upper cross member (not shown) on the opposite structure. A ladder or stairway 15 may also extend from the lower cross member 12 on one structure 11 to the upper cross member on the other structure to assist in unifying the scaffold unit.

Each leg 10 includes an outer tubular upper member 16, which is secured to the cross member 12, and an inner lower member 17 telescoped within the upper member, the lower member having an outside diameter substantially equal to the inside diameter of the outer member, in order to have a sliding telescopic fit therewith. The lower end of the inner member 17 may be provided with a suitable caster and caster mounting 18 to facilitate movement of the scaffold unit.

It is to be noted that the lower end of the outer tubular member 16 has a plurality of longitudinal slots 19, forming segments 20 which are bent outwardly to impart an inherent tendency for the segments to expand away from the inner leg member 17. A split or segmental nut 21 is welded, or otherwise secured, to the lower segmented end of the outer tubular member 16 and has an upper tapered portion 22 inclined inwardly and upwardly. Actually, a solid nut may be welded to the lower end of the tubular upright 16 and the two members slotted to form the segments 20, 21 which are bent outward slightly, in order that the nut 21 inherently tends to disengage from the inner leg 17.

The inner leg 17 is externally threaded for cooperation with the internal thread on the split nut 21. The major portion of the inner leg is threaded, but its upper portion 23 remains unthreaded for a purpose to be described hereinafter. A collar 24 is disposed over the outer leg 16, being movable downwardly into engagement with the split nut 21 to hold its segments firmly in engagement with the threads 17a of the inner leg and prevent disengagement of the nut therefrom because of its inherent outward expansion tendency.

When adjustment of a leg 10 is desired, the collar 24 is moved upwardly from engagement with the split nut 21, which permits the latter to expand outwardly slightly and remove its internal threads from engagement with the external threads 17a on the inner leg 17. The inner leg may then be moved upwardly or downwardly within the outer leg member 16 to adjust the effective length of the leg structure, whereupon the collar 24 is disposed over the split nut 21, first engaging its upper tapered surface 22 to force the nut back into threaded engagement with the leg 17 and then moving over the outer cylindrical surface of the nut 21 in snug relation therewith, to prevent its disengagement from the leg member 17, thus securely locking the inner and outer leg members 17, 16 together. Downward movement of the collar is limited by engagement of its shoulder 25 with the tapered nut portion 22.

By virtue of the telescopic movement of the inner leg member 17 within the outer leg member 16, a rapid adjustment can be made in the effective length of the leg 10. If a finer adjustment is required, the collar 24 is disposed over the split nut 21, to cause its threaded engagement with the inner leg 17, and the latter is then rotated in the proper direction, which produces its threading within the split nut 21 and a corresponding alteration of the telescopic relation of the inner member within the outer member, thereby modifying the effective length of the leg to a fine degree, depending upon the lead or pitch of the threads.

The major portion of the inner leg member 17 is threaded, but its upper portion 23 remains unthreaded, so as to prevent complete unscrewing of the inner leg from the upper, outer leg member 16. It is apparent that unthreading of the inner leg member within the split nut 21 eventually engages the lower end 23a of its unthreaded upper portion 23 with the nut, which precludes further rotation and unscrewing of the inner member. The unthreaded upper portion 23 of the inner leg has sufficient length to provide a proper telescopic fit with the outer member 16 and insure appropriate support of the latter by the inner leg portion without lateral deflection.

When a plurality of legs 10 are used in a device, the effective length of each leg can be varied independently of the other legs. As disclosed in Fig. 1, the scaffold unit is disposed in such position that one pair of legs 10 rests on a step 26 having a higher elevation than the support 27 for the other pair of legs. The scaffold may be supported on such step 26 and the other support 27 with all legs 10 in a vertical position by merely shortening the effective length of one pair of legs on the step, or conversely, lengthening the effective length of the other pair of legs, as the case may be. A rapid adjustment may be made on any leg through removing the retaining collar 24 from its encompassing position on the split nut 21, and telescoping the leg members 16, 17 with respect to each other, whereupon the collar 24 may be disposed over the nut to hold it in threaded engagement with the inner leg member 17, and a fine adjustment made on any leg requiring such adjustment through rotating the inner leg member 17 with respect to the outer leg member 16. Any other equipment of which the legs 10 form a part may be similarly adjusted.

It is, accordingly, apparent that a leg construction has been provided whose effective length can be adjusted quickly as well as to fine degrees. The construction is such that the parts are locked against inadvertent movement from adjusted position, nor can the parts be completely disengaged from one another unintentionally.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A scaffold supporting leg comprising a vertical tubular outer supporting leg member terminating at its lower end in a plurality of downwardly extending outwardly radially biased resilient fingers integral therewith, an inner member telescopically received within the outer member, said inner member having an upper cylindrical bearing portion engaging a complementary portion of said outer supporting leg member and having an externally threaded lower portion, a segmental internally threaded nut fixedly secured to said fingers for threaded engagement with the threaded portion of the inner member when the fingers are forced inwardly, and a collar on the outer member movable relative to the nut to force the fingers inwardly to place the nut into threaded engagement with the threads of the inner member and to retain such engagement until the collar is moved relative to the nut to permit the fingers to move radially outwardly, the length of the threaded portion on the inner member being substantially greater than the length of the threaded portion of the nut.

WALLACE J. S. JOHNSON.

REFERENCES CITED

The following references are of record in the file of this patent:

UNITED STATES PATENTS

| Number | Name | Date |
| --- | --- | --- |
| 376,810 | Brill | Jan. 24, 1888 |
| 411,481 | Willson | Sept. 24, 1889 |
| 1,197,727 | Finkle | Sept. 12, 1916 |
| 1,886,112 | Luarde | Nov. 1, 1932 |
| 1,973,948 | Fogelstrom | Sept. 18, 1934 |
| 2,043,498 | Uecker | June 9, 1936 |
| 2,256,892 | Burman | Sept. 23, 1941 |
| 2,327,050 | Kotler | Aug. 17, 1943 |
| 2,388,179 | Prowd | Oct. 30, 1945 |

FOREIGN PATENTS

| Number | Country | Date |
| --- | --- | --- |
| 976 | Great Britain | Jan. 23, 1885 |